United States Patent [19]

Melander

[11] Patent Number: 4,819,791
[45] Date of Patent: Apr. 11, 1989

[54] CONVEYOR BELT FOR BULK MATERIAL HANDLING

[75] Inventor: Sverker Melander, Landskrona, Sweden

[73] Assignee: Arne Wehtje, Lund, Sweden

[21] Appl. No.: 220,903

[22] PCT Filed: Jul. 19, 1988

Related U.S. Application Data

[63] Continuation of Ser. No. 881,683, filed as PCT SE85/00409 on Oct. 22, 1985, published as WO86/02621 on May 9, 1986, abandoned.

[30] Foreign Application Priority Data

Oct. 23, 1984 [SE] Sweden ................................ 8405284

[51] Int. Cl.$^4$ ............................................. B65G 15/40
[52] U.S. Cl. ..................................... 198/818; 198/819; 198/847
[58] Field of Search ............... 198/818, 819, 823, 825, 198/847

[56] References Cited

U.S. PATENT DOCUMENTS

| 571,604 | 11/1986 | Robins Jr. | |
| 700,308 | 5/1902 | Dodge | 198/823 X |
| 722,039 | 3/1903 | Plummer | 198/823 X |
| 722,041 | 3/1903 | Plummer | 198/825 X |
| 2,656,035 | 10/1953 | Thomson et al. | 198/847 |
| 2,839,181 | 6/1958 | Renner | 198/819 |
| 2,998,121 | 8/1961 | Gilbert | 198/823 X |
| 3,557,941 | 1/1971 | Thomson | 198/847 X |
| 3,578,149 | 5/1971 | Thomson | 198/847 X |
| 3,615,152 | 10/1971 | Bouzat et al. | 198/818 X |
| 4,410,082 | 10/1983 | McGinnis | 198/818 |

FOREIGN PATENT DOCUMENTS

| 8806 | 3/1980 | European Pat. Off. | |
| 1083487 | 1/1955 | France | |
| 118429 | 12/1969 | Norway | |
| 179825 | 6/1962 | Sweden | |
| 189474 | 5/1964 | Sweden | |
| 215107 | 9/1967 | Sweden | |
| 430577 | 8/1967 | Switzerland | |
| 737338 | 9/1955 | United Kingdom | 198/823 |
| 1274923 | 5/1972 | United Kingdom | |
| 81/016917 | 6/1981 | World Int. Prop. O. | |

Primary Examiner—Randolph A. Reese
Assistant Examiner—Anthony Knight
Attorney, Agent, or Firm—Ladas & Parry

[57] ABSTRACT

Conveyor belt for bulk material handling. The conveyor belt (1) consists of a central part (2) and two integrated side parts (3, 4) which side parts are from the beginning manufactured angled in relation to the integrated central part in order to give the conveyor belt an increased resistance to bending. The central part (2) is preformed to contain longitudinal and transversal reinforcement in its lower part in order to increase the thickness of the wear resisting material in the upper part. The side parts (3, 4) are provided with wearing resisting material and longitudinal and transversal reinforcement. The side parts are angled at an angle alpha in relation to the central part, which angle in a preferred embodiment is approximately 45° or 90°. The conveyor belt is carried by cables (5, 6), or a number of rollers.

8 Claims, 3 Drawing Sheets

CONVEYOR BELT FOR BULK MATERIAL HANDLING

This is a continuation of co-pending application Ser. No. 881,683, filed as PCT SE85/00409 on Oct. 22, 1985, published as WO86/02621 on May 9, 1986, now abandoned.

THE FIELD OF THE INVENTION

The present invention refers to a conveyor belt for bulk material handling. The invention relates more specifically to a conveyor belt specifically suitable for long conveyors, for instance, up to 30 km or longer.

PRIOR ART

Conveyor belts have been used for bulk material transport for more than one hundred years. For instance an application for a patent regarding a conveyor belt was made as early as 1886, see U.S. Pat. No. 571,604.

The published South-African patent application No. 807771 describes a flexible conveyor belt, which is flat in rest and intended to be used in a trough shape on a conveyor. Guiding rolls give said belts the trough shape.

The U.S. Pat. No. 3,615,152 described reinforced conveyor belts with longitudinal layers of reinforcement and a number of transversal layers of reinforcement. Also in that patent specification the conveyor belt is originally flat and shaped into a trough or channel form. The conveyor belt can pass over a track which also includes changes of direction.

In the published European patent application No. 79103373.1 (EP-A1-8806) also a long, endless conveyor intended to be shaped to a trough shape is described.

All these specifications only cover flat belts, uniform in thickness, the cross sections of which are shaped into different forms with different types of sets of guiding rollers. The belt is shaped into a trough form or in such a way that the bulk material is totally enclosed by the cross section of the belt being approximately drop-shaped or tube-shaped.

In later years belt conveyors have been developed, carried by steel cables, specifically used for long conveying distances using only one endless belt (up to now about 30 km or longer) and only one driving station. The steel cables have a separate tensioner, which has a considerably higher tension than that of the conveyor belt. The cables are carried by special sets of rollers. The belts are also flat and of uniform thickness with different types of reinforcement and provided with special ribs with tracks for the cables. The steel cables carry and drive the belt with the mentioned tracks. The same applies to the returning side (underside) of the belt. Naturally, ordinary rollers can also be used for the returning side.

The disadvantage with the previously known technology is due to the recurrent flexing of the belt and of the material between the carrying idlers (set of rollers). These recurrent flexings cause an inherent work in both the conveyor belt and the conveyed material. The flexing also increases spillage and wearing on the side parts of the belt.

The conveyor belt is driven by a source of power. Necessary power depends on different resistances to motion of a belt conveyor made up of various resistances which, according to ISO 5048-1979 (E), can be classified into five groups:
1. Main resistance, $F_H$;
2. Secondary resistance, $F_N$;
3. Special main resistance, $F_{s1}$;
4. Special secondary resistance, $F_{s2}$;
5. Slope resistance, $F_{st}$.

The resistances mainly comprises the following factors:
1. Friction in the idler bearings and seals;
2. Belt advancement resistance, resulting from the impression of the idlers in the belt;
3. The above-mentioned recurrent flexing of the belt and of the material.

In order to reduce the resistances, one or more of these factors must be reduced. Friction losses in bearings and seals are unavoidable and can only be reduced by reducing the number of idlers. The same applies to the resistance resulting from the impression of the idlers in the belt.

The above-mentioned movements in the belt results in heating of the belt which in certain occasions can be a disadvantage.

SUMMARY OF THE INVENTION

The object of the present invention is to provide a conveyor belt for bulk material handling, which reduces power consumption, reduces spillage and at the same time increases capacity, making it possible to build long conveyors, for instance, 30 km with one driving station, increases the endurance of the belt, reduces wearing, applies the strength of reinforcement where it is best utilised, reduces maintenance costs, makes the belt self-aligning and reduces the possible radius of curvature laterally as well as vertically.

The above object is achieved according to the present invention by designing the conveyor belt with a built-in profile so that the side parts of the conveyor belt are shaped at an angle to the central part of the conveyor belt. This central part comprises a longidutinal and transversal reinforcement in its under part and wear resistant material in its upper part facing against the carrying part of the material conveyed. Furthermore, the side parts of the conveyor belt incorporate wear resistant material and longitudinal as well as transversal reinforcement. Naturally, reinforcement in the central part of the belt as well as its side parts can be connected as a unit, for instance, a reinforcing mat throughout the belt.

By arranging the conveyor belt with an original folding of the side parts many advantages are achieved. A considerable increase of the resistance against bending is achieved, which increases the resistance against deflection between the idlers. This entails that the distance between the idlers may be increased, which reduces the friction losses caused by the bearings and seals.

By the increased resistance against bending, the movement of the side parts is reduced thus reducing spillage. At the same time the belt can be loaded more heavily, which results in increased capacity. The maintenance costs are also reduced as the endurance of the belt increases.

By the reduced spillage and reduced flexing of the belt and material the belt speed can be increased, which further makes possible an increased capacity.

By arranging the belt in the way described in this application, the belt is self-aligning and it is possible to reduce the radius of curvature laterally as well as vertically.

BRIEF DESCRIPTION OF THE DRAWINGS

The invention is described more in details below, referring to the preferred embodiments shown on the drawings.

DETAILED DESCRIPTION OF PREFERRED EMBODIMENTS

Figure 1:
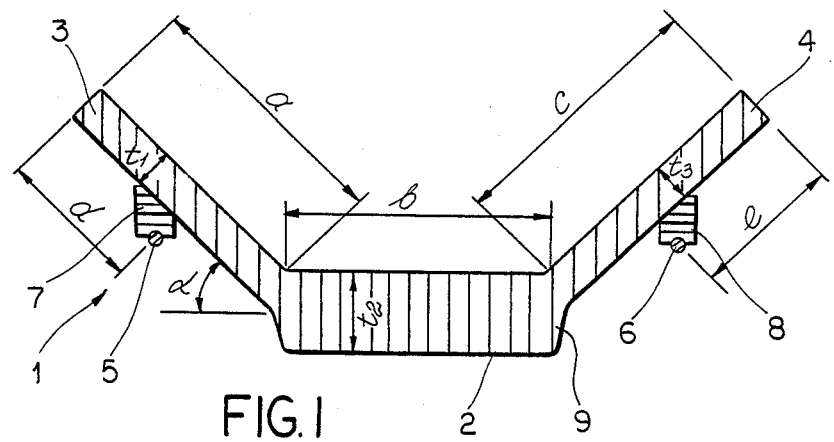
FIG. 1 is a cross section of a conveyor belt according to the invention carried by cables.
Figure 5:
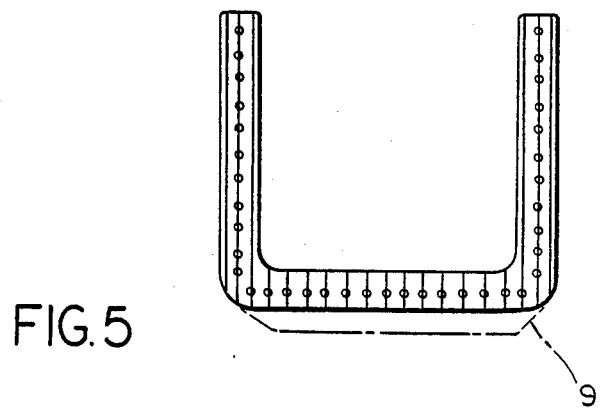
FIG. 5 is a cross section similar to FIG. 1 but with another shape of the conveyor belt.

FIG. 1 shows a cross section of a conveyor belt 1 made according to the present invention. The conveyor 1 comprises a central part 2 and two integrally connected side parts 3 and 4, as shown in FIG. 1. The central part 2 has a width b and the side parts have a width a and c respectively in their plane. The central part 2 has a thickness $t_2$ and the side parts $t_1$ and $t_3$ respectively. The side parts are angled up an angle alpha in relation to the horizontal and are from the beginning manufactured with those angles. The angling shown in FIG. 1 causes the conveyor belt to have roughly a V-shaped form in cross section. The angle alpha between respective side part and the horizontal part can vary considerably. The angle alpha should exceed 5° in order to have a minimum of required resistance to bending of the conveyor belt. Otherwise, the angle alpha can have any value, between for instance 5° and 170°. The preferred lowest value of the angle alpha is at least 20°. The largest suitable angle can be approximately 120°. In FIG. 1 there is shown a preferred angle of 45°, which is a suitable compromise between resistance against bending and ability to carry bulk material. In FIG. 5 there is shown an angle of 90°, which gives the conveyor belt an increased resistance against bending.

In FIG. 1 the conveyor belt is shown carried by two cables 5 and 6 with suitable tracks connected with the belt.

The track members 7 and 8 are positioned at a distance of d and e, respectively from the side parts edges. The track members 7 and 8 are positioned anywhere along the side parts but are shown in FIG. 1 in the middle of the side parts.

In FIG. 1 the thickness of the central part is shown as $t_2$, which is equal to or larger than the thickness of the side parts. $t_2$ can be made thicker, when necessary, since the central part is normally exposed to greater wear.

Figure 2:
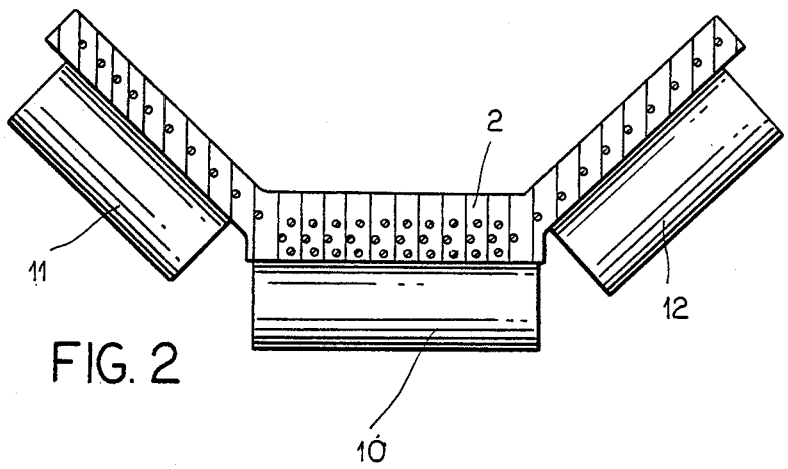
FIGS. 2–4 are cross sections similar to FIG. 1 and comprising different kinds of reinforcements.

In FIG. 2 shows a conveyor belt having only longitudinal reinforcement consisting of steel cables or cables of any other material, for instance aramid. The reinforcement of the side parts can consist of other material than in the central part 2 or in the protruding part 9 of the central part 2. This type of reinforcement can especially be used in very long conveyors with one driving station.

Figure 3:
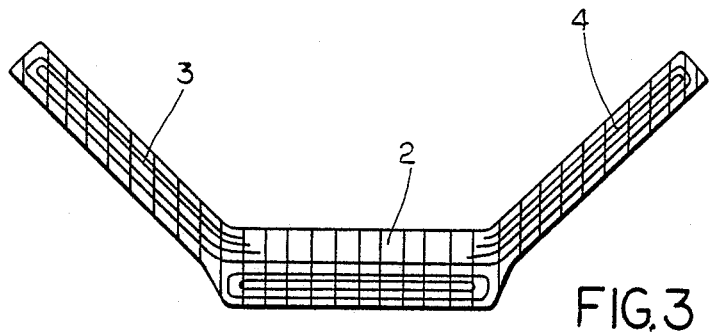

FIG. 3 shows a belt strengthening which gives a strong resistance of the wear surface of the central part and could be used with great advantage at normal length of conveyor belts. The reinforcement of the belt can consist of one or more reinforcement mats or transversal discrete reinforcement as spring steel or cold drawn material with high material strength. The transversal reinforcement of the belt covers the two side parts and extends partly into the central part in order to increase the resistance for transversal bending between the side parts and the central part in the corners and to give further space for wear resisting material in the central part.

Figure 4:
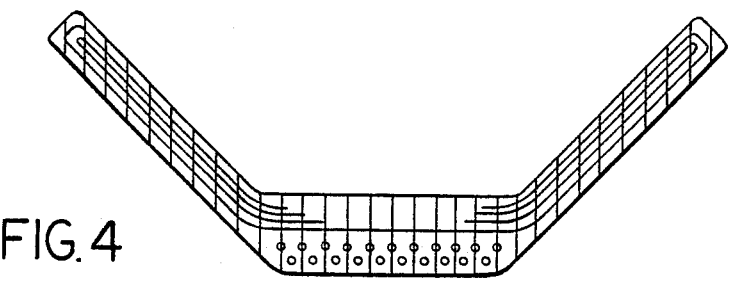

FIG. 4 shows a combination of reinforcement shown in FIGS. 2 and 3 and thus useful for relatively long belts with a strong increased depth of the wearing resisting material in the central part of the belt.

In FIG. 5 it is shown that the angle alpha can be equal to 90°. The protruding part 9 is shown with broken lines and is left out in this embodiment.

Figure 6:
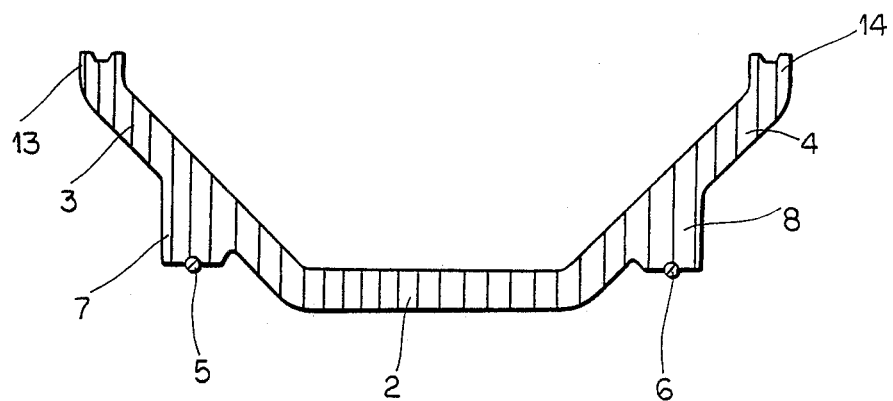
FIG. 6 is a cross section of an alternative embodiment of the conveyor belt.

In FIG. 6 there is shown a general cross section of a conveyor belt for instance carried by steel cables. Variations of the reinforcement can be made as in FIGS. 2, 3 and 4 or in many other ways.

The conveyor belt is provided with a top layer and a bottom layer, and any now existing natural or synthetic material can be used therefore, or a combination thereof. For the reinforcement suitable materials are steel, metals and alloys thereof, different polyamides, aramids, glass fibre, synthetic fibre, natural products as cotton, jute etc. Said materials and combinations thereof can be used in all kinds of reinforcement of the side parts and central part of the conveyor belt and can be used for transversal reinforcement as well as longitudinal. Mats of above-mentioned materials can also be used as reinforcement in one or more layers (plies).

In FIG. 2 it is shown that the conveyor belt can be carried by two or more roller stands where the side rollers have an angle alpha in relation to the horizontal plane. The rollers only support the side parts of the belt and can be positioned on a greater distance from each other than is normal according to prior art, on account of the increased resistance to bending, which is acheived by the profiling of the belt. In FIG. 2 there is shown a central roller 10 which carries the central part 2 of the conveyor belt and two side rollers 11 and 12 guiding the side parts 3 and 4 of the conveyor belt.

The number of rollers can vary in different applications. It is possible to use a V-shaped conveyor belt where the central part 2 is very short and only two rollers which have an angle in relation to each other. Alternatively five rollers can be used whereby each side part is divided into two parts angled in relation to each other. Further variations are possible within the scope of the invention.

In FIG. 6 there is shown a conveyor belt where the protruding part 9 is eliminated. The conveyor belt is carried as in FIG. 1 by two cables 5 and 6. These cables can consist of steel cables, nylon cables or cables of any other known suitable material. Furthermore, there are two track members 13 and 14 positioned at respective edges of the side parts. These track members are intended for the return part of the belt where the belt is carried by cables. This also applies to FIG. 8.

Figure 7:
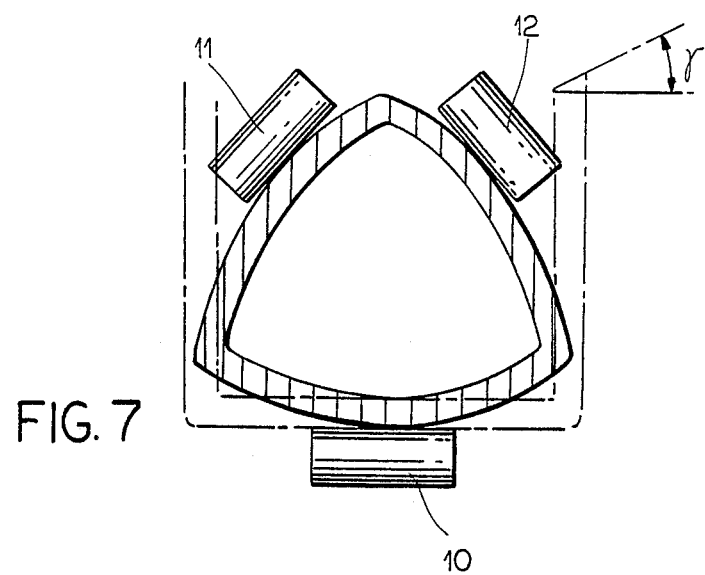
FIG. 7 is a cross section corresponding to FIG. 5 but the cross section's upper edges are bent to form a closed shape by means of rollers.
Figure 8:
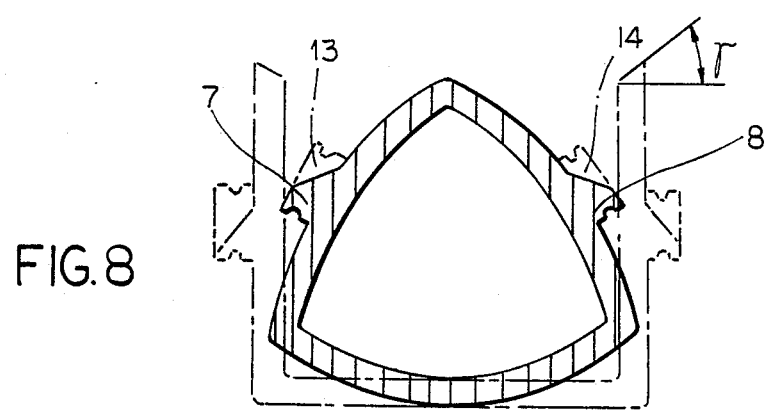
FIG. 8 is also a cross section corresponding to FIG. 5 but the cross section is bent to a closed shape by means of cables.

Even if the V-shape shown in FIG. 1 or the U-shape shown in FIG. 5 is preferred, it is possible to have the side parts as well as the central part forming a bent shape. In FIG. 7 there is shown a cross section corresponding to FIG. 5 where the vertical legs and the central part by means of rollers have been bent to a closed form. In FIG. 8 there is shown a cross section corresponding to FIG. 6 wherein the vertical and the central parts have been bent to a closed form by means of cables. The top of each side part forms an angle gamma to the horizontal plan. This angle can of course vary from close to 90° to almost 0°.

Figure 9:
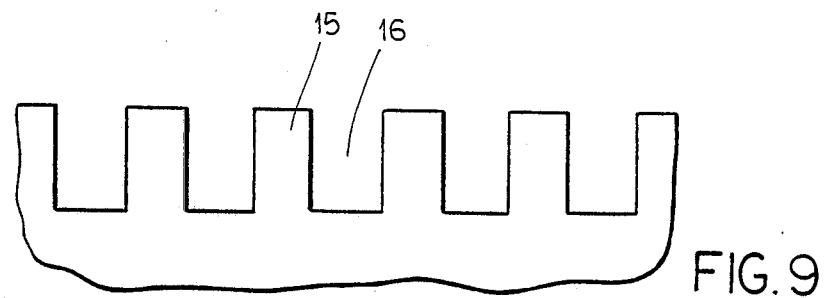
FIG. 9 is a cross section corresponding to FIGS. 5, 7 and 8 where the outer edges are provided with an interference member.

It is an advantage if the bent edges have a grip into each other. For that reason, as is shown in FIG. 9, the edges can be provided with openings which makes it possible to get a grip between the two edges like a zip fastener. FIG. 9 is thus a side view over the top part of the respective edges of the conveyor belt. The edges are provided with cam-like projections 15 corresponding to the openings 16. These projections and openings are alternately positioned in order to get a grip into each other when the edges are bent together as shown in FIGS. 7 and 8. In this manner a relative movement between the edges is prevented and a seal achieved.

Profiling the conveyor belt into a V-shape or similar shape causes the rollers to produce an automatic centering effect, as shown in FIG. 2. The belt will automatically be centered to the position shown in FIG. 2 without a tendency to crawl up on one or the other side. The protruding part 9 assists in this respect.

The invention has above been described referring to preferred embodiments. The invention can naturally be modified in many ways by a person skilled in the art. Such modifications are intended to be included within the scope of the invention as defined in the appended claims.

I claim:

1. Conveyor belt for transportation of bulk material, comprising a central part and two integrated side parts which side parts are in an unbiased, free-state form angled in relation to the central part to obtain a substantial inherent stiffness, and to achieve self aligning of the belt; a lower portion of the central part comprises a longitudinal and transversal reinforcement and that an upper portion thereof comprises resisting material and said side parts are covered with wear resistant material and longitudinal and transversal reinforcements in their bulk material carrying part; the transversal reinforcement covers the side part and extends partly into the central part in order to increase the resistance to transveral bending; the transversal reinforcement maintains the side parts in an angled state throughout all operations of the conveyor belt; and the side parts having equal height and the thickness of the central part being equal to or thicker than the thickness of the side parts.

2. Conveyor belt as claimed in claim 1 wherein said side parts are arranged with an angle relative to the central part of between 20° and 120°.

3. Conveyor belt as claimed in claim 2 wherein said angle is 45°.

4. Conveyor belt as claimed in claim 2 wherein said angle is 90°.

5. Conveyor belt as claimed in claim 1 wherein the conveyor belt is carried by a plurality of rollers arranged in a stand, the central part as well as the side parts are carried by the rollers.

6. Conveyor belt as claimed in claim 5, wherein the rollers (11) for the side parts are arranged to bend the side parts in such a way that the edges of the side parts contact each other and the conveyor belt is formed to a closed profile.

7. Conveyor belt as claimed in claim 6, wherein said edges are provided with gripping members in order to lock the edges together in longitudinal direction to achieve the effect of a zip fastener.

8. Conveyor belt as claimed in claim 1, wherein the conveyor belt further includes second groove members as an integrated part of the conveyor belt, which members are so formed that they can be supported by the cables during a return run.

* * * * *